US00RE47617E

(19) United States
(12) Reissued Patent
Galla

(10) Patent Number: US RE47,617 E
(45) Date of Reissued Patent: Sep. 24, 2019

(54) LIFTING MECHANISM WITH LIFT STAND ACCOMMODATION

(71) Applicant: Thomas J. Galla, Arlington Heights, IL (US)

(72) Inventor: Thomas J. Galla, Arlington Heights, IL (US)

(21) Appl. No.: 14/802,808

(22) Filed: Jul. 17, 2015

Related U.S. Patent Documents

Reissue of:
(64) Patent No.: 8,684,332
Issued: Apr. 1, 2014
Appl. No.: 13/426,849
Filed: Mar. 22, 2012

(51) Int. Cl.
*B66F 5/02* (2006.01)
*B66F 13/00* (2006.01)
*B66F 5/04* (2006.01)

(52) U.S. Cl.
CPC ..... *B66F 13/00* (2013.01); *B66F 5/04* (2013.01)

(58) Field of Classification Search
CPC ..... B66F 5/04
USPC ..... 254/10 B, 10 C, 93 H, 93 R; 4/564.1, 4/667
See application file for complete search history.

(56) References Cited

U.S. PATENT DOCUMENTS 1,751,480 A * 3/1930 Howell ..... 254/7 R
1,949,718 A * 3/1934 Jackson ..... B66F 3/247 254/3 B
2,583,114 A * 1/1952 Monteith ..... 414/743
2,621,019 A * 12/1952 Mueller ..... 254/10 B
3,841,603 A * 10/1974 Lund et al. ..... 254/4 R
3,967,814 A * 7/1976 Leibundgut ..... 254/8 B
4,085,953 A * 4/1978 Farwell ..... 254/10 C
4,248,405 A * 2/1981 Kameda ..... 254/10 B
4,479,632 A * 10/1984 McIntire et al. ..... 254/3 B
4,658,933 A * 4/1987 Cheek et al. ..... 187/220
4,902,191 A * 2/1990 Cumbest et al. ..... B66C 23/48 254/10 R
5,174,414 A * 12/1992 Burns ..... 187/210
6,050,546 A * 4/2000 Peschmann et al. ..... 254/10 B
6,345,807 B1 * 2/2002 Cacciatore ..... 254/3 B
6,598,855 B1 * 7/2003 Petrone ..... B66F 7/0625 254/10 R
6,954,979 B2 * 10/2005 Logan ..... 29/700
(Continued)

FOREIGN PATENT DOCUMENTS

GB 2354753 A * 4/2001 ..... B66F 5/04

*Primary Examiner* — Robert M Fetsuga
(74) *Attorney, Agent, or Firm* — David J. Pitman; Fulwider Patton LLP

(57) ABSTRACT

The present invention is a lifting mechanism with lift stand accommodation, which is used to allow a lift stand to reside within its bounding space. The present invention comprises a lifting mechanism and a Y-shaped chassis. The Y-shaped chassis comprises a lift mechanism housing and a U-shaped base. The U-shaped base comprises a base slot that allows a jack stand frame to be inserted between its left and right end. The lifting mechanism is used to raise and lower an object from its initial position. The lifting mechanism comprises a left support arm, a right support arm, a lift arm and a U-shaped lift platform. The U-shaped platform comprises a platform slot that can allow a jack stand saddle to be inserted between its left platform end and right platform end. A brace maintains the rigidity of the lift arm, the left support arm, and the right support arm.

24 Claims, 4 Drawing Sheets

AMENDED

(56) References Cited

U.S. PATENT DOCUMENTS

| | | | | |
|---|---|---|---|---|
| 7,004,454 | B2 * | 2/2006 | Petrone et al. | 254/10 R |
| 7,137,615 | B2 * | 11/2006 | Ray et al. | 254/10 B |
| 7,347,409 | B2 * | 3/2008 | Goza | 254/2 B |
| 7,413,166 | B2 * | 8/2008 | Arzouman | 254/8 B |
| 7,927,195 | B1 * | 4/2011 | Kapke et al. | 452/165 |
| 2003/0218157 | A1 * | 11/2003 | Arzouman | 254/8 B |
| 2004/0256607 | A1 * | 12/2004 | Spitsbergen | 254/334 |
| 2008/0067480 | A1 * | 3/2008 | Hernandez et al. | 254/134 |
| 2008/0296879 | A1 * | 12/2008 | Gilhuly | 280/769 |
| 2009/0159861 | A1 * | 6/2009 | Gray et al. | 254/131 |
| 2011/0089389 | A1 * | 4/2011 | Weber | 254/3 B |
| 2012/0112147 | A1 * | 5/2012 | Hernandez, Jr. | B66F 3/30 254/93 H |
| 2013/0248786 | A1 * | 9/2013 | Galla | 254/2 B |

* cited by examiner

AMENDED

AMENDED

AMENDED

AMENDED

LIFTING MECHANISM WITH LIFT STAND ACCOMMODATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

*This application is a reissue of U.S. patent application Ser. No. 13/426,849, filed Mar. 22, 2012, now U.S. Pat. No. 8,684,332, issued Apr. 1, 2014, which is incorporated by reference herein in its entirety.*

The present invention relates generally to vehicle lift mechanisms. In particular, the objective of the present invention is to raise a vehicle about its designated lifting point, while accepting a common jack stand within the same space as the present invention.

BACKGROUND OF THE INVENTION

To perform maintenance on a vehicle, a hydraulic jack is used to raise the vehicle from its current position, in which a jack stand is used to maintain the current raised height of the vehicle. Conventional hydraulic jacks must raise a vehicle at a location that is not within the vicinity of designated lifting area that the jack stand is required to be placed. This problem can pose safety risks and maneuverability difficulties. The present invention simplifies this problem using a slotted lifting platform and a slotted base. The present invention is a lifting mechanism with lift stand accommodation that allows an object to be lifted about a point while also allowing a lift stand, a jack stand, or any similar existing technology to be positioned within the space that the present invention occupies. The slotted base and the slotted lifting platform together provide this additional function to such hydraulic jacks.

It is understood that the described version of the present invention is not limited entirely to hydraulic lifting mechanisms, and that any lifting technology can provide the lifting function.

DETAIL DESCRIPTIONS OF THE INVENTION

All illustrations of the drawings are for the purpose of describing selected versions of the present invention and are not intended to limit the scope of the present invention.

Figure 1:
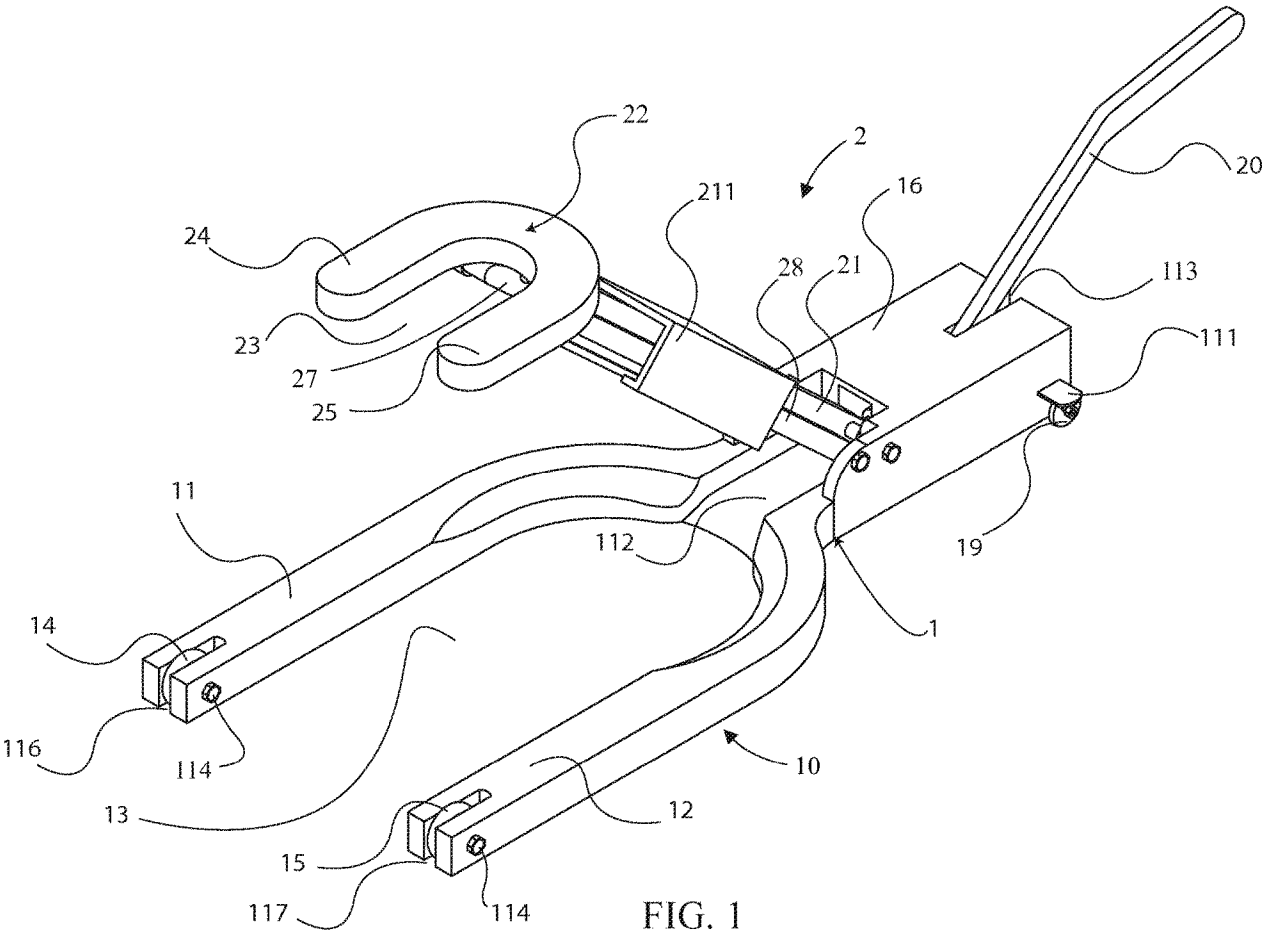
FIG. 1 is an isometric perspective view of the present invention.
Figure 4:
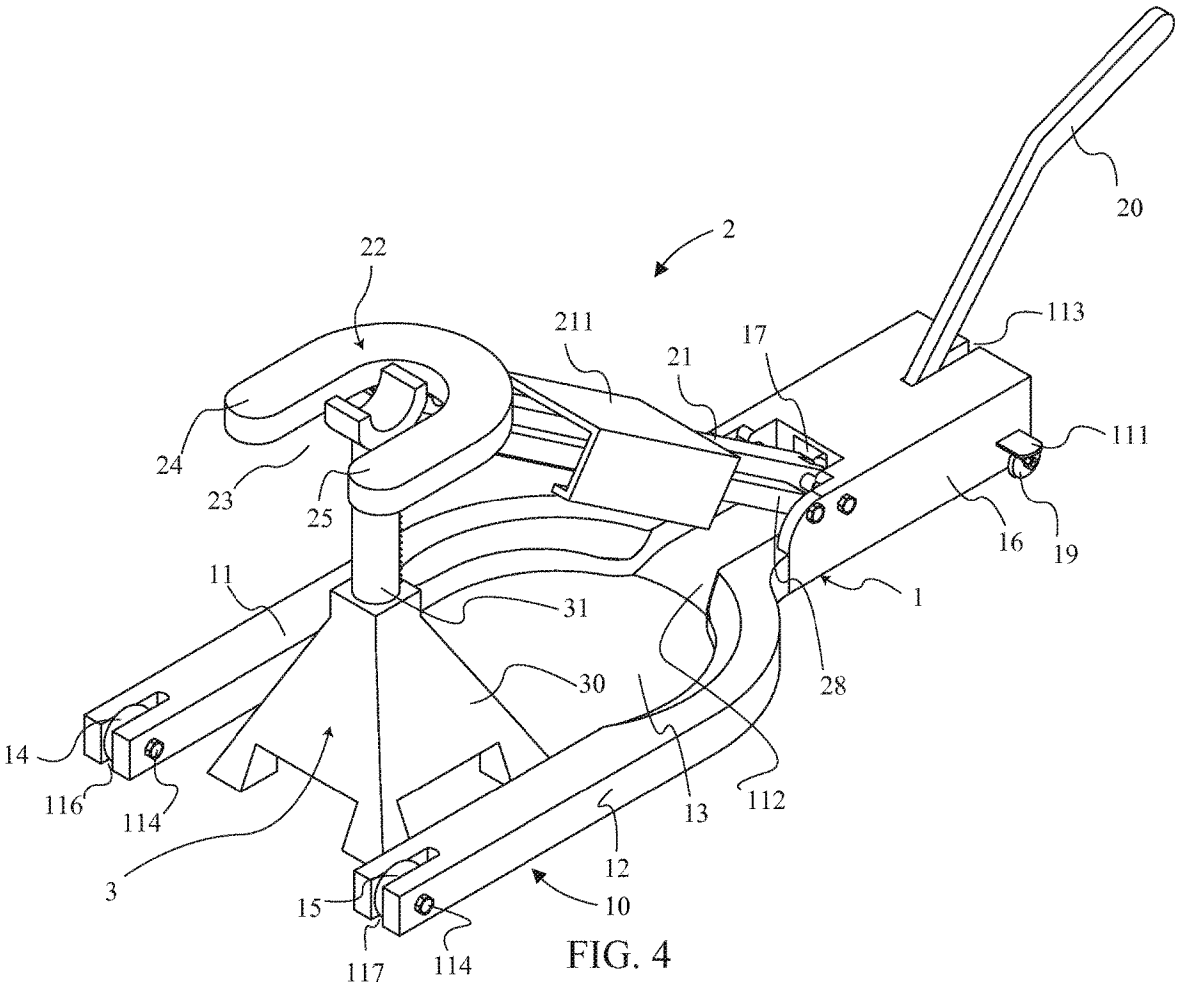
FIG. 4 is an isometric perspective view of the present invention thereof, showing a conventional lift stand positioned within the space that the present invention occupies.

The present invention is a vehicle lift mechanism that provides the ability to have a conventional jack stand 3 inserted within its bounding space durance any instance in the lift process. The lift process is defined as the process in which the present invention raises the position of the vehicle above its initial height. The U-shaped base 10 and the U-shaped lift platform 22 of the present invention provide the additional function of allowing a conventional jack stand 3 to be inserted within the same lift space that the present invention occupies. There are two main components that provide this function: the Y-shaped jack chassis 1, and the U-shaped lift platform 22 of the lift mechanism. FIG. 1 shows an embodiment of the present invention. FIG. 4 shows the embodiment of the present invention with a conventional jack stand 3 within the base slot 13 and the platform slot 23—an example of how a conventional jack stand 3 would be located within the same space as the present invention. The conventional jack stand frame 30 is within the base slot 13, and the conventional jack stand saddle 31 is within the platform slot 23.

The Y-shaped jack chassis 1 comprises a U-shaped base 10 and a lift mechanism housing 16, which are shown in FIG. 1 and FIG. 4. The U-shaped base 10 has a base slot 13, which is positioned symmetrically within the left end 11 and the right end 12 of the U-shaped base 10. This resulting arrangement of the U-shaped base 10 should similarly resemble the shape of the capital letter "U." The base slot 13 in its preferred embodiment should have the ability to house any conventional jack stand frame. This allows a conventional jack stand frame 30 to be positioned in between the left end 11 and the right end 12 of the U-shaped base 10 without having to adjust the current position of the Y-shaped jack chassis 1 during the lift process. The lift mechanism housing 16 is connected to the U-shaped base 10, opposite of the base slot 13. The resulting shape of the Y-shaped jack chassis 1 from the combination of these two components should similarly resemble the capital letter "Y." Such an arrangement gives the present invention a three point base, which should increase its stability whenever the elevation of the lifted vehicle increases during the lift process. The left end 11 and the right end 12 of the U-shaped base 10 increase the stability of the present invention during the lift process because the Y-shaped does not rest upon a central rest point, which can allow swaying; however, the U-shaped base 10 is divided into two equidistant rest points from the present invention's centroid, which are symmetrical about the lift mechanism housing 16—the lift mechanism housing 16 provides a third rest point. Therefore, the present invention will remain rigid and in place if a conventional jack stand 3 is to be inserted within the bounding space of the U-shaped base 10. Within the lift mechanism housing 16 is a lift mechanism cavity 17, which the lift actuator 26 is housed. This is shown in the cross sectional portion, 3-3, of FIG. 3. A lift arm slot 112 is positioned atop the lift mechanism housing 16, near the U-shaped base 10. A lever slot 113 is positioned atop the lift mechanism housing 16, adjacent to the lever slot 113. Each the lift arm slot 112 and the lever slot 113 traverse the lift mechanism housing 16 into the lift mechanism cavity 17.

Figure 2:
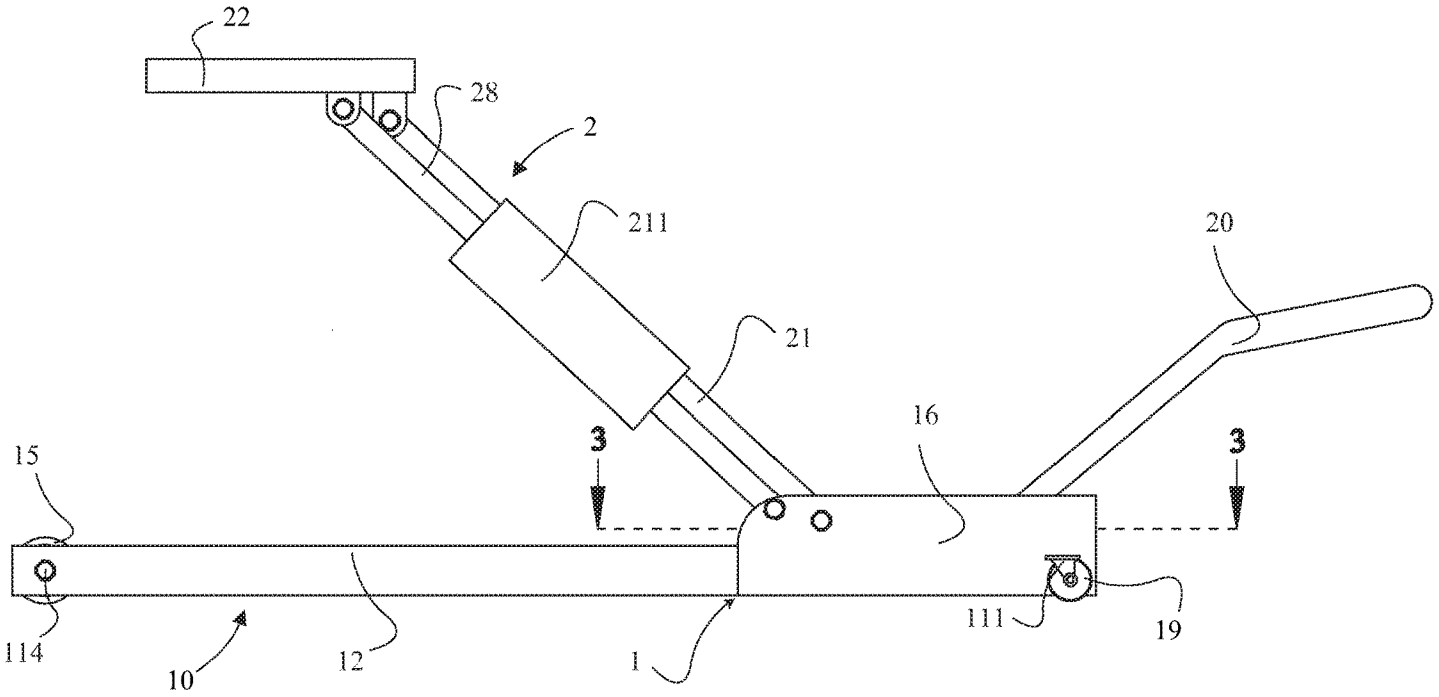
FIG. 2 is a right perspective view of the present invention thereof, showing the plane upon which a cross-sectional view is taken and shown in FIG. 3.

The lift mechanism 2 provides the lift during the lift process. The lift mechanism 2 comprises a lift actuator 26, a lift arm 21, a right support arm 28, a left support arm 27, a lever 20 and a U-shaped lift platform 22. These components are shown in FIG. 1, FIG. 2, and FIG. 4. Similar to the U-shaped base 10, a platform slot 23 is positioned within the left platform end 24 and the right platform end 25 on the U-shaped lift platform 22; concurrently, the U-shaped base 10 should similarly resemble the shape of the capital letter "U." The platform slot 23 in its preferred embodiment should be able to house any conventional jack stand saddle 31 or any plurality of similar functional components to a conventional jack stand that holds the designated lift section of a vehicle. Also, the U-shaped lift platform 22, in its preferred embodiment, should have a sufficient surface area, so that it can effectively accept the load of a vehicle and remain rigid during the lift process. It is the shape of the U-shaped lift platform 22 that provides the functional ability to allow such a conventional jack stand saddle 31 to receive the weight of a vehicle without altering the position of the present invention, whenever a conventional jack stand 3 is needed. Once the conventional jack stand 3 receives the load of the vehicle, the lift process can be reversed and the present invention may be removed from its current position.

Figure 3:
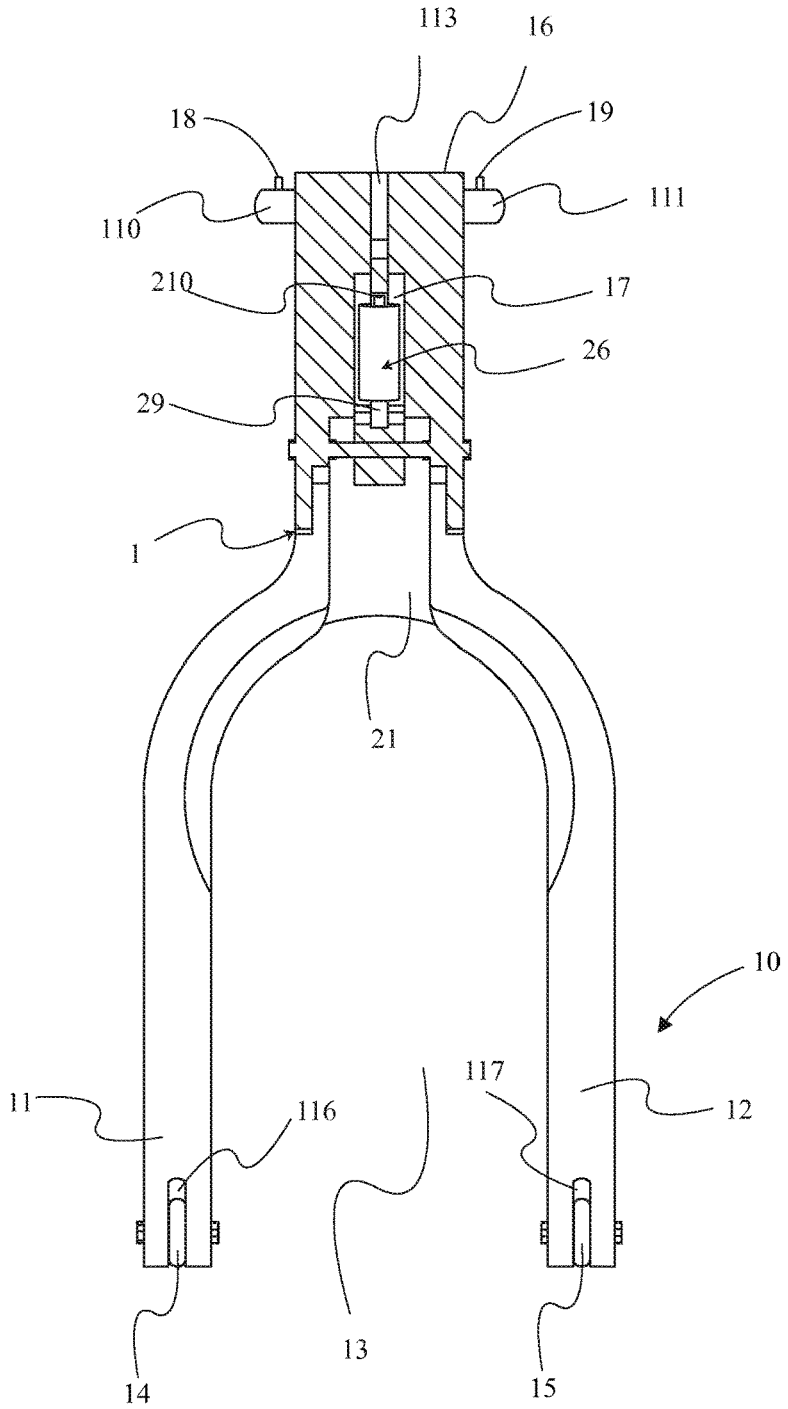
FIG. 3 is a top side cross-sectional view thereof taken along line 3-3 of FIG. 2.

The lift actuator 26 comprises a lever connection 210 and an actuator arm, which is shown in FIG. 3. A lift actuator 26 is necessary for a lift process because it can convert a users' energy into mechanical lifting energy. The lever 20 of the lifting mechanism traverses through the lever slot 113 on the lift mechanism housing 16, wherein the lever 20 is mechanically connected to the lever connection 210 of the lift actuator 26. The lift actuator 26, in its preferred embodiment, is a hydraulic pump that magnifies a smaller force into a larger force. The present invention assumes the lift actuator 26 uses existing or future hydraulic technology that converts a users' energy to lift. For example, such a process involves using the lever 20 to pump a fluid from a cylinder of a given surface area to a cylinder of larger surface area. The applied force from "pumping" or repeated rotations of the lever 20 is transferred to the lift actuator arm 29, causing the lift arm 21 to translate laterally. The actuator arm 29 is mechanically connected to the lift actuator 26, in which the actuator arm 29 can both translate and rotate.

The U-shaped lift platform 22 is rotationally connected by the left support arm 27 and the right support arm 28. Each the left support arm 27 and the right support arm 28 are rotationally connected to the lift mechanism housing 16. Both the left support arm 27 and the right support arm 28 allow the U-shaped lift platform 22 to remain horizontal and parallel to the ground surface which the present invention rests upon—serving as stabilizers. Also, both the left support arm 27 and the right support arm 28 assist the lift arm 21 by partially distributing the load of the vehicle during the lift process. The lift arm 21 is pivotally connected to the lift mechanism housing 16 within the lift arm slot 112. The location of this connection is the pivot axis of the lift arm 21, which in its preferred embodiment will provide the lift function the present invention. This lift, or rotation of the lift arm 21, is applied by the lift actuator 26. The bottom of the lift arm 21 is rotationally connected to the actuator arm 29. The translation of the lift arm 21 due to the lift actuator 26 being engaged allows the lift arm 21 to rotate about its pivoted connection with the lift mechanism housing 16 as aforementioned. Since the lift arm 21, the left support arm 27, and the right support arm 28 are each rotationally connected to the U-shaped lift platform 22, both the left support arm 27 and the right support arm 28 should rotate in a similar direction as the lift arm 21 during the lift process.

The rotational connections of the lift arm 21, the left support arm 27 and the right support 28 arm to the U-shaped lift platform 22 allow the U-shaped lift platform 22 to remain level with the ground surface. In other words, the U-shaped lift platform remains horizontal throughout the entire lift process. The U-shaped platform 22 is able to remain horizontal because the left support arm 27 and the right support arm 28 are offset a designated spatial distance from the lift arm 21. Although, the U-shaped lift platform 22 should remain horizontal if the rotational connections of the lift arm 21, the left support arm 27 and the right support arm 28 are similarly rotationally connected to the lift mechanism housing 16 with similar spatial offset distances. Therefore, the left support arm 27 and the right support arm 28 should rotate concentrically with the lift arm 21 during the lift process which should result in the U-shaped lift platform 22 remaining horizontal.

Because there is unequal load distribution through the lift arm 21 and each the left 27 support arm and the right support arm 28, a brace 211 is used to maintain the rigidity of each the left support arm 27, the right support arm 28, and the lift arm 21. The brace 211 is shown in FIG. 1, FIG. 2, and FIG. 4. The brace 211 mechanically attaches to the left support arm 27, the right support arm 28, and the lift arm 21; while the brace 211 partially encloses the outer surfaces of the left support arm 27, the right arm 28, and the lift arm 21. The brace 211 will prevent the left support arm 27 and the right support arm 28 from bowing during the lift process.

It is important to have wheels on the Y-shaped jack chassis 1 to allow the present invention to be removed quickly and safely from under a vehicle after a conventional jack stand 3 has been locked into position. This removal process should begin while a conventional jack stand 3 is within the platform slot 23—a quick removal reduces safety risks. A left end wheel 14 and a right end wheel 15 are attached to the left end 11 and the right end 12 of the U-shaped base 10. Both are shown in FIG. 1-4. Furthermore, the left end wheel 14 is enclosed by the left end 11 of the U-shaped base 10, which resides in the left end wheel slot 116. The left end wheel slot 116 is positioned on the left end 11 of the U-shaped base 10. Also, the right end wheel 15 is enclosed by the right end 12 of the U-shaped base 10, which resides in the right end wheel slot 117. The right end wheel slot 117 is positioned on the right end 12 of the U-shaped base 10. Each the left end wheel 14 and the right end wheel 15 rotate about a wheel axle 114. Having such wheels enclosed within the U-shaped base 10 as opposed to having such wheels enclosing the left end 11 and the right end 12 maximizes space within the base slot 13. A sharper turning radius is sometimes necessary when the present invention resides in an area with reduced space, increasing maneuverability. In order for the present invention to have a sharper turning radius a pair of pivot wheels—a left pivot wheel 18 and a right pivot wheel 19—are attached to the lift mechanism housing 16. Pivot wheels have the ability to rotate about the axis which is perpendicular to the axis of the pivot wheel axle 114. The pivot wheel axle 114 can rotate in such a manner because it is rotationally attached to a pivot wheel housing. This allows the present invention to be steered, allowing non-linear movement. The left pivot wheel 18 resides within the left pivot wheel housing 110, in which a pivot wheel axle 114 traverses through the left pivot wheel 18 and the left pivot wheel housing 110. The right pivot wheel 19 resides within the right pivot wheel housing 111, in which a pivot wheel axle 114 traverses through the right pivot wheel 19 and the right pivot wheel housing 111. Each pivot wheel axle 114 is rotationally fixed to its housing.

Although the invention has been explained in relation to its preferred embodiment, it is to be understood that many other possible modifications and variations can be made without departing from the spirit and scope of the invention as hereinafter claimed.

What is claimed is:

1. A lifting mechanism with lift stand accommodation comprises, a Y-shaped jack chassis;

a lift mechanism;

the Y-shaped jack chassis comprises a U-shaped base and a lift mechanism housing;

the U-shaped base comprises a left end, a right end, a left end wheel slot, a right end wheel slot, a base slot, a left end wheel, and a right end wheel;

the left end wheel and the right end wheel each comprise a wheel axle;

the lift mechanism housing comprises a lifting mechanism cavity, a left pivot wheel, a right pivot wheel, a left pivot wheel housing, a right pivot wheel housing, a pair of pivot wheel axles, a lift arm slot, and a lever slot;

the lifting mechanism comprises a brace, lever, a lift arm, a U-shaped lift platform, a lift actuator, a left support arm, and a right support arm;

the U-shaped lift platform comprises a platform slot, a left platform end, and a right platform end; and the lift actuator comprises a lever connection and an actuator arm.

2. The lifting mechanism with lift stand accommodation as claimed in claim 1 comprises, the base slot being positioned in the U-shaped base between the left end and the right end;

the lift mechanism housing being connected to the U-shaped base, opposite of the base slot;

the platform slot being positioned in the U-shaped lift platform between the left platform end and the right platform end;

the left end wheel slot traversing into the left end; and the right end wheel slot traversing into the right end.

3. The lifting mechanism with lift stand accommodation as claimed in claim 2 comprises, the left front wheel being partially housed within the left end wheel slot;

the right front wheel being partially housed within the right end wheel slot;

the left pivot wheel housing being connected to the lift mechanism housing, adjacent to the lift arm;

the right pivot wheel housing being connected to the lift mechanism housing, opposite of the left pivot wheel housing;

the left pivot wheel being rotationally attached to the left pivot wheel housing; and the right pivot wheel being rotationally attached to the right pivot wheel housing.

4. The lifting mechanism with lift stand accommodation as claimed in claim 3 comprises, each the left front wheel and the right front wheel being traversed by a wheel axle;

the wheel axle traversing the left front wheel being rotatably attached across the left front wheel slot;

the wheel axle traversing the right front wheel being rotatably attached across the right front wheel slot;

the left pivot wheel and the right pivot wheel being each being traversed by a pivot wheel axle;

a pivot wheel axle being rotationally connected to the left pivot wheel housing; and a pivot wheel axle being rotationally connected to the right pivot wheel housing.

5. The lifting mechanism with lift stand accommodation as claimed in claim 1 comprises, the lift mechanism cavity being located within the lift mechanism housing;

the lift arm slot positioned atop the lift mechanism housing; and the lever slot being positioned atop the lift mechanism housing, adjacent to the lift arm slot.

6. The lifting mechanism with lift stand accommodation as claimed in claim 5 comprises, the lift arm slot traverses through the lift mechanism housing into the lift mechanism cavity;

the lever slot traverses through the lift mechanism housing into the lift mechanism cavity, opposite to the lift arm slot;

the lift actuator being housed within the lift mechanism cavity; and the lever being mechanically attached to the actuator.

7. The lifting mechanism with lift stand accommodation as claimed in claim 6 comprises, the lift actuator being a hydraulic pump.

8. The lifting mechanism with lift stand accommodation as claimed in claim 1 comprises, the left support arm being rotatably connected to the U-shaped platform;

the left support arm being rotatably connected to the lift mechanism housing, opposite of the U-shaped platform;

the right support arm being rotatably connected to the U-shaped platform, adjacent to the left support arm;

the right support arm being rotatably connected to the lift mechanism housing, opposite of the U-shaped platform;

the lift arm being rotatably connected to the U-shaped platform;

the lift arm being pivotally connected to the lift mechanism housing, within the lift arm slot;

the lift arm being rotatably connected to the lift actuator arm, opposite of the U-shaped platform; and the brace being mechanically attached each the left support arm, the right support arm, and the lift arm.

9. A lifting mechanism with lift stand accommodation comprises, a Y-shaped jack chassis;

a lift mechanism;

the Y-shaped jack chassis comprises a U-shaped base and a lift mechanism housing;

the U-shaped base comprises a left end, a right end, a left end wheel slot, a right end wheel slot, a base slot, a left end wheel, and a right end wheel;

the left end wheel and the right end wheel each comprise a wheel axle;

the lift mechanism housing comprises a lifting mechanism cavity, a left pivot wheel, a right pivot wheel, a left pivot wheel housing, a right pivot wheel housing, a pair of pivot wheel axles, a lift arm slot, and a lever slot;

the lifting mechanism comprises a brace lever, a lift arm, a U-shaped lift platform, a lift actuator, a left support arm, and a right support arm;

the U-shaped lift platform comprises a platform slot, a left platform end, and a right platform end;

the lift actuator comprises a lever connection and an actuator arm;

the base slot being positioned in the U-shaped base between the left end and the right end; and the platform slot being positioned in the U-shaped lift platform between the left platform end and the right platform end.

10. The lifting mechanism with lift stand accommodation as claimed in claim 9 comprises, the lift mechanism housing being connected to the U-shaped base, opposite of the base slot;

the left end wheel slot traversing into the left end;

the right end wheel slot traversing into the right end;

the left end wheel being partially housed within the left end wheel slot; and the right end wheel being partially housed within the right end wheel slot.

11. The lifting mechanism with lift stand accommodation as claimed in claim 10 comprises, the left pivot wheel housing being connected to the lift mechanism housing, adjacent to the lift arm;

the right pivot wheel housing being connected to the lift mechanism housing, opposite of the left pivot wheel housing;

the left pivot wheel being rotationally attached to the left pivot wheel housing;

the right pivot wheel being rotationally attached to the right pivot wheel housing;

each the left end wheel and the right end wheel being traversed by a wheel axle;

the wheel axle traversing the left end wheel being rotatably attached across the left end wheel slot;

the wheel axle traversing the right end wheel being rotatably attached across the right end wheel slot;

the left pivot wheel and the right pivot wheel being each being traversed by a pivot wheel axle;

a pivot wheel axle being rotationally connected to the left pivot wheel housing; and a pivot wheel axle being rotationally connected to the right pivot wheel housing.

12. The lifting mechanism with lift stand accommodation as claimed in claim 9 comprises, the lift mechanism cavity being located within the lift mechanism housing;

the lift arm slot positioned atop the lift mechanism housing;

the lever slot being positioned atop the lift mechanism housing, adjacent to the lift arm slot; and the lift arm slot traverses through the lift mechanism housing into the lift mechanism cavity.

13. The lifting mechanism with lift stand accommodation as claimed in claim 12 comprises, the lever slot traverses through the lift mechanism housing into the lift mechanism cavity, opposite to the lift arm slot;

the lift actuator being housed within the lift mechanism cavity; and the lever being mechanically attached to the actuator.

14. The lifting mechanism with lift stand accommodation as claimed in claim 13 comprises, the lift actuator being a hydraulic pump.

15. The lifting mechanism with lift stand accommodation as claimed in claim 9 comprises, the left support arm being rotatably connected to the U-shaped platform;

the left support arm being rotatably connected to the lift mechanism housing, opposite of the U-shaped platform;

the right support arm being rotatably connected to the U-shaped platform, adjacent to the left support arm;

the right support arm being rotatably connected to the lift mechanism housing, opposite of the U-shaped platform;

the lift arm being rotatably connected to the U-shaped platform;

the lift arm being pivotally connected to the lift mechanism housing, within the lift arm slot;

the lift arm being rotatably connected to the lift actuator arm, opposite of the U-shaped platform; and the brace being mechanically attached each the left support arm, the right support arm, and the lift arm.

16. A lifting mechanism with lift stand accommodation comprises, a Y-shaped jack chassis;

a lift mechanism;

the Y-shaped jack chassis comprises a U-shaped base and a lift mechanism housing;

the U-shaped base comprises a left end, a right end, a left end wheel slot, a right end wheel slot, a base slot, a left end wheel, and a right end wheel;

the left end wheel and the right end wheel each comprise a wheel axle;

the lift mechanism housing comprises a lifting mechanism cavity, a left pivot wheel, a right pivot wheel, a left pivot wheel housing, a right pivot wheel housing, a pair of pivot wheel axles, a lift arm slot, and a lever slot;

the lifting mechanism comprises a brace, lever, a lift arm, a U-shaped lift platform, a lift actuator, a left support arm, and a right support arm;

the U-shaped lift platform comprises a platform slot, a left platform end, and a right platform end;

the lift actuator comprises a lever connection and an actuator arm;

the base slot being positioned in the U-shaped base between the left end and the right end;

the platform slot being positioned in the U-shaped lift platform between the left platform end and the right platform end;

the left end wheel being partially housed within the left end wheel slot; and the right end wheel being partially housed within the right end wheel slot.

17. The lifting mechanism with lift stand accommodation as claimed in claim 16 comprises, the lift mechanism housing being connected to the U-shaped base, opposite of the base slot;

the left end wheel slot traversing into the left end;

the right end wheel slot traversing into the right end;

the left pivot wheel housing being connected to the lift mechanism housing, adjacent to the lift arm;

the right pivot wheel housing being connected to the lift mechanism housing, opposite of the left pivot wheel housing;

the left pivot wheel being rotationally attached to the left pivot wheel housing;

the right pivot wheel being rotationally attached to the right pivot wheel housing; and each the left end wheel and the right end wheel being traversed by a wheel axle.

18. The lifting mechanism with lift stand accommodation as claimed in claim 17 comprises, the lift mechanism cavity being located within the lift mechanism housing;

the lift arm slot positioned atop the lift mechanism housing;

the lever slot being positioned atop the lift mechanism housing, adjacent to the lift arm slot;

the lever slot traverses through the lift mechanism housing into the lift mechanism cavity, opposite to the lift arm slot;

the lift arm slot traverses through the lift mechanism housing into the lift mechanism cavity;

the wheel axle traversing the left end wheel being rotatably attached across the left end wheel slot;

the wheel axle traversing the right end wheel being rotatably attached across the right end wheel slot;

the left pivot wheel and the right pivot wheel being each being traversed by a pivot wheel axle;

a pivot wheel axle being rotationally connected to the left pivot wheel housing; and a pivot wheel axle being rotationally connected to the right pivot wheel housing.

19. The lifting mechanism with lift stand accommodation as claimed in claim 16 comprises, the lift actuator being housed within the lift mechanism cavity; and the lever being mechanically attached to the actuator.

20. The lifting mechanism with lift stand accommodation as claimed in claim 16 comprises, the left support arm being rotatably connected to the U-shaped platform;

the left support arm being rotatably connected to the lift mechanism housing, opposite of the U-shaped platform;

the right support arm being rotatably connected to the U-shaped platform, adjacent to the left support arm;

the right support arm being rotatably connected to the lift mechanism housing, opposite of the U-shaped platform;

the lift arm being rotatably connected to the U-shaped platform;

the lift arm being pivotally connected to the lift mechanism housing, within the lift arm slot;

the lift arm being rotatably connected to the lift actuator arm, opposite of the U-shaped platform; and the brace being mechanically attached each the left support arm, the right support arm, and the lift arm.

*21. A method of raising a load, comprising:*

*providing a lifting mechanism that includes:*

*a base formed to include a left base end and a right base end, wherein a base slot separates the left base end from the right base end;*

*a platform having a left platform end and a right platform end, wherein a platform slot separates the left platform end from the right platform end; and*

*a lift actuator for raising the platform in relation to the base;*

*raising the load using the lifting mechanism; then*

*after the load has been raised, positioning a jack stand in relation to the lifting mechanism by:*

(*a*) *inserting an upper portion of the jack stand within the platform slot; and*

(*b*) *inserting a lower portion of the jack stand within the base slot.*

*22. The method of claim 21, further including, allowing the jack stand to receive the load.*

*23. The method of claim 22, further including removing the lifting mechanism from a current position.*

*24. The method of claim 21, wherein positioning the jack stand includes not adjusting the position of the lifting mechanism.*

* * * * *